United States Patent [19]

Tomita

[11] Patent Number: 5,023,523
[45] Date of Patent: Jun. 11, 1991

[54] HORIZONTAL DEFLECTION CIRCUIT
[75] Inventor: Hideo Tomita, Chiba, Japan
[73] Assignee: Sony Corporation, Tokyo, Japan
[21] Appl. No.: 524,076
[22] Filed: May 16, 1990
[30] Foreign Application Priority Data May 16, 1989 [JP] Japan .................................. 1-122447
May 16, 1989 [JP] Japan .................................. 1-122448

[51] Int. Cl.⁵ .......................... G09G 1/04; H01J 29/70
[52] U.S. Cl. ..................................... 315/364; 315/387; 315/403
[58] Field of Search ....................... 315/387, 403, 364; 358/140

[56] References Cited
U.S. PATENT DOCUMENTS

4,414,494 11/1983 Schmidt .............................. 315/395

Primary Examiner—Gregory C. Issing
Attorney, Agent, or Firm—Lewis H. Eslinger

[57] ABSTRACT

A horizontal deflection circuit for a multiple-scanning type television receiver that receives a video signal that can have a number of horizontal frequencies is comprised of a detecting circuit for detecting a deflection width of the input video signal, a comparator for comparing a detected deflection width with a signal proportional to the picture size of the input video signal in the horizontal direction, an adder for adding an output of the comparator and the picture size signal, a voltage signal generating circuit for generating a voltage signal proportional to the horizontal frequency of the input video signal, and a multiplying circuit for multiplying an output signal of the adder and an output signal of the voltage signal generating circuit, wherein a horizontal output circuit is controlled on the basis of the output signal of the multiplying circuit. A horizontal deflection width detecting circuit is also provided, in which a horizontal deflection width of the input video signal is detected by peak-rectifying a horizontal deflection pulse. A discharging current source proportional to the horizontal frequency of the input video signal is connected to a peak-rectifying circuit for detecting the deflection width without error.

5 Claims, 5 Drawing Sheets

HORIZONTAL DEFLECTION CIRCUIT

BACKGROUND OF THE INVENTION

1. Field of the Invention

This invention relates generally to horizontal deflection circuits and, more particularly, to a horizontal deflection circuit for use with a multiple-scanning type television receiver that can receive video signals having different horizontal frequencies.

2. Description of the Background

Figure 1:
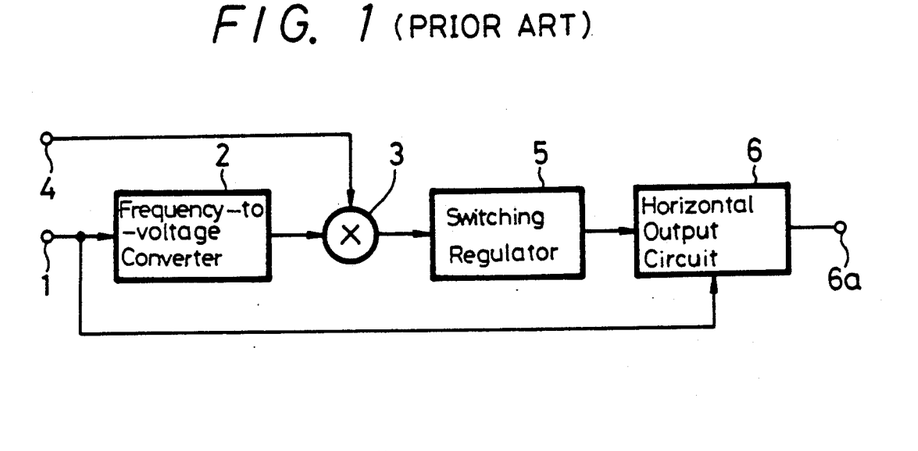
FIG. 1 is a schematic in block diagram form of an example of a prior-art horizontal deflection circuit.

Recently, a so-called multiple-scanning type television receiver has been developed. This multiple-scanning type television receiver required a horizontal deflection circuit that can provide a constant horizontal deflection regardless of a change in the horizontal or line frequency of the video signal input for display. An example of a proposed horizontal deflection circuit for use in a multiple-scanning type television receiver is shown in FIG. 1. In that example, a horizontal synchronizing signal is applied to an input terminal 1 and then fed to a frequency-to-voltage converter 2, where it is converted to a voltage signal whose level is changed in proportion to the frequency of the horizontal synchronizing signal. The voltage signal from frequency-to-voltage converter 2 is supplied to one input of a multiplier 3.

A second input terminal 4 has supplied thereto a deflection control signal that is used to vary the width of deflection of the beam in the horizontal direction. The deflection control signal applied to input terminal 4 is supplied to the other input terminal of multiplier 3, so that the voltage signal corresponding to the frequency of the horizontal synchronizing signal is changed in response to the deflection width indicated by the deflection control signal. The product signal from multiplier 3 is supplied to a switching regulator 5 as a control signal, and switching regulator 5 produces a DC output signal in response to the multiplied signal. This DC output signal is supplied to a horizontal output circuit 6 as a power supply source signal, and the horizontal synchronizing signal at input terminal 1 is also supplied to horizontal output circuit 6, whereby a horizontal deflection output signal having a cycle based on the horizontal synchronizing signal is developed at an output terminal 6a, which is connected to the deflection coil (not shown) of the television receiver.

According to the above-described horizontal deflection circuit, in response to a change in the horizontal frequency of the input video signal the frequency of the horizontal synchronizing signal at input terminal 1 will change accordingly, whereby the power supply source voltage fed to horizontal output circuit 6 from switching regulator 5 will also change. Therefore, the horizontal deflection width can be controlled substantially to fall in a predetermined range, regardless of changes in the line frequency of the video input signal.

Figure 2:
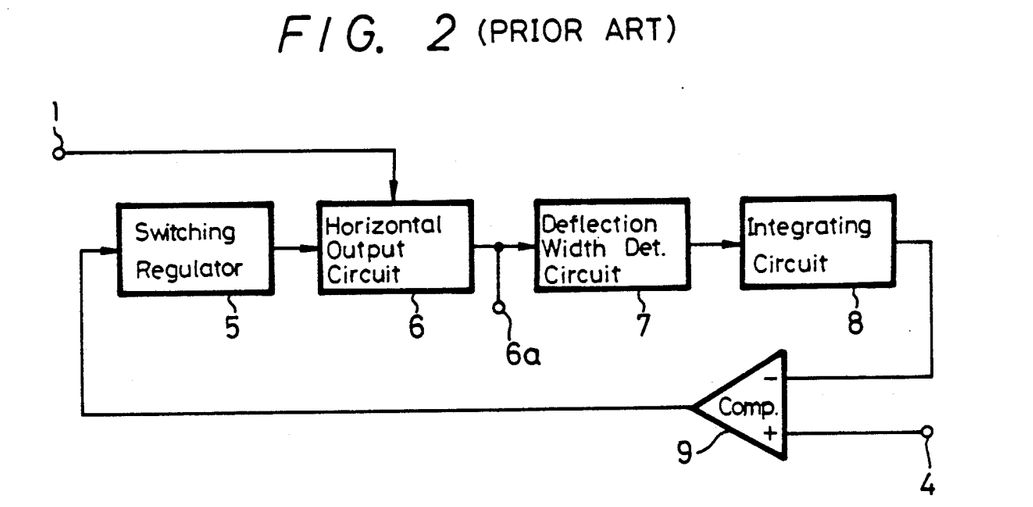
FIG. 2 is a schematic in block diagram form of another example of a prior-art horizontal deflection circuit.

Alternatively, the horizontal deflection circuit may be constructed as shown in FIG. 2, in which like parts corresponding to those of FIG. 1 have the same reference numerals and need not be described in detail.

In FIG. 2, the horizontal synchronizing signal applied to horizontal synchronizing signal input terminal 1 is again supplied directly to horizontal output circuit 6, and the output signal from horizontal output circuit 6 is supplied to a deflection width detecting circuit 7. Deflection width detecting circuit 7 detects a horizontal deflection width from the output signal of horizontal output circuit 6 and produces a output signal that is integrated by an integrating circuit 8 and is then fed to one input of a comparator 9. The electronic control signal that is proportional to the deflection width is again applied to deflection control signal input terminal connected to the other input of comparator 9. Comparator 9 compares the deflection width indicated by the control signal with a real deflection width indicated by the detected signal to generate a compared result, that is, a difference signal. This difference signal from comparator 9 is supplied to switching regulator 5 as a control signal, and a DC signal from switching regulator 5 is again supplied to horizontal output circuit 6 as a power source voltage. Deflection width detecting circuit 7 operates so that a horizontal deflection pulse signal derived from horizontal output circuit 6 is peak-rectified, thereby detecting the deflection width from a rectified value.

The method in which the horizontal deflection pulse is peak-rectified to detect the deflection width, however, cannot avoid the disadvantage that when the line frequency fluctuates the value to be detected also fluctuates, thereby causing an error in the detected value. This error condition will be described more fully with reference to the waveform diagram of FIG. 3.

Figure 3:
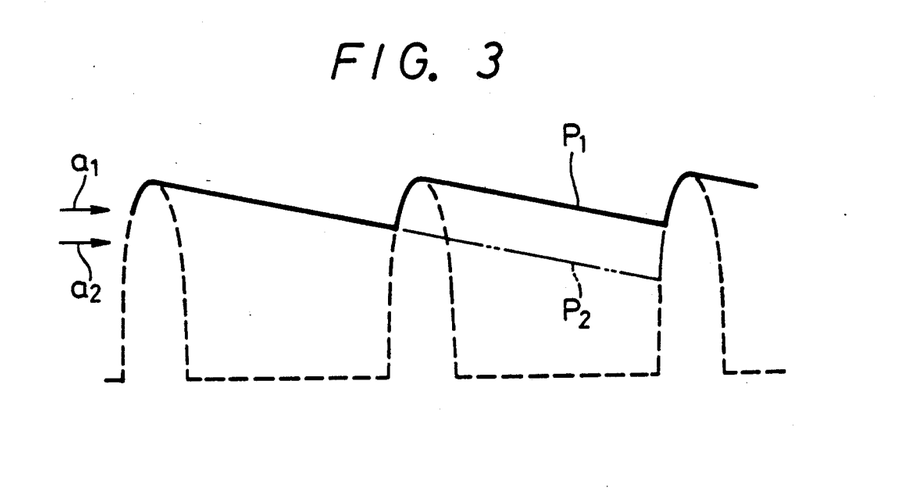
FIG. 3 is a waveform diagram useful in understanding the operations of the prior-art horizontal deflection circuits of FIGS. 1 and 2.

If it is assumed that a horizontal deflection pulse signal generated from the horizontal output circuit is shown by a dashed line in FIG. 3, then a peak-rectified value $P_1$ of the horizontal deflection pulse signal will change in a predetermined range near the peak value of the pulse signal, as shown by a solid line in FIG. 3. In that case, the mean value level of the peak-rectified value $P_1$ is represented by level $a_1$ in FIG. 3. Assuming that the horizontal frequency of the incoming video signal is reduced by one half, then the interval between the horizontal deflection pulse signals is widened by a factor of two, whereby the width in which a peak-rectified value $P_2$ is changed is widened to twice that of the peak-rectified value $P_1$. As a result, the mean value level $a_2$ will be lower than the mean value level $a_1$. When the mean value is lowered as described above, even though the real deflection width is not changed, it is detected as if the deflection width had changed, thereby producing an error in the detected value.

With recent developments in broadcasting techniques, the horizontal frequency of video signals has become higher and higher. In fact, such horizontal frequency is as high as several times the horizontal frequency according to the ordinary broadcasting standard (15.75 kHz). If a video signal with such a high horizontal frequency is input to the detecting circuit, there is then the substantial possibility that an error will occur in detecting the deflection width.

In accordance with the horizontal deflection circuit of FIG. 2, as in the example of the horizontal deflection circuit of FIG. 1, regardless of a change in horizontal frequency of the video signal, the horizontal deflection width can be substantially controlled to fall in a predetermined range. More particularly, the deflection width to be controlled and the real deflection width are compared by comparator 9, and switching regulator 5 is controlled so as to reduce the resultant difference, whereby the horizontal deflection width can be prevented from fluctuating with changes in horizontal frequency.

Nevertheless, the horizontal deflection circuit shown in FIG. 1 has the unavoidable disadvantage that the horizontal deflection width fluctuates very slightly in accordance with an increase in horizontal frequency $f_H$ of the incoming video signal.

Figure 4:
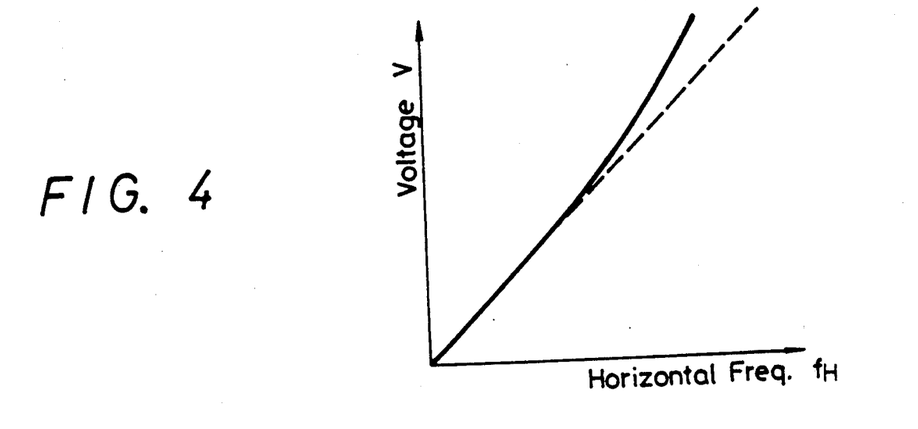
FIG. 4 is a graph of horizontal frequency versus output voltage used to explain the disadvantages of the horizontal deflection circuit of FIG. 1.

More specifically, although the horizontal frequency $f_H$ and the output voltage V of the switching regulator 5 are directly proportional to each other, as shown by a dashed line in FIG. 4, in practice the output voltage V increases at a higher rate in accordance with increases of the horizontal frequency $f_H$, as shown by a solid line in FIG. 4, resulting in the horizontal deflection width fluctuating by about 10 to 20%. The reason that the horizontal deflection width fluctuates is that even though the horizontal frequency changes the beam blanking period, or retrace period, does not change. This will be described in more detail with reference to FIGS. 5A and 5B.

Figure 5A:
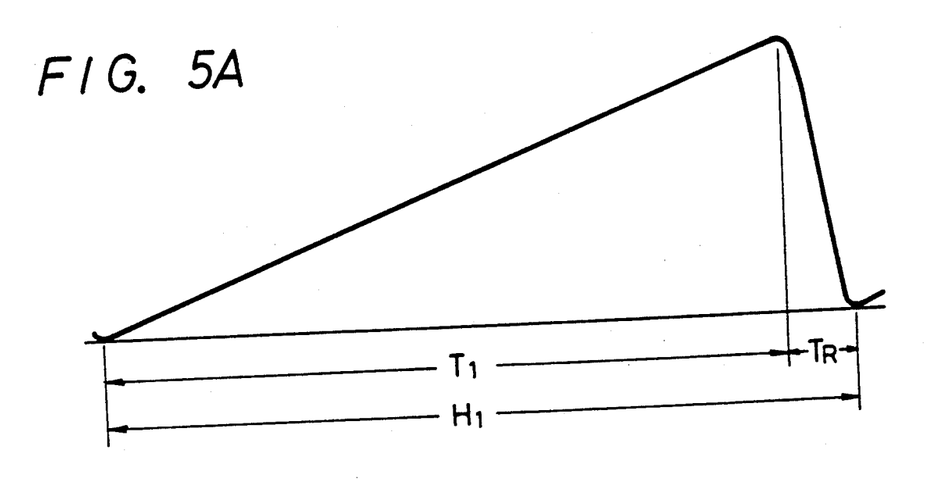
FIGS. 5A and 5B are waveform diagrams useful in explaining the disadvantages of the prior-art horizontal deflection circuits of FIGS. 1 and 2.
Figure 5B:
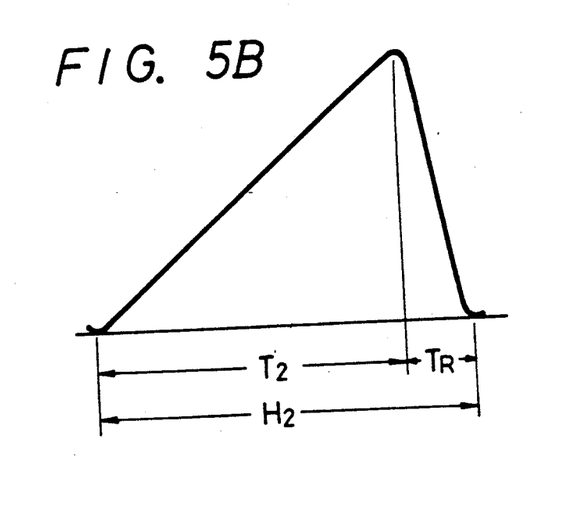

In a signal supplied to a horizontal deflection coil during one horizontal scanning period H at a certain horizontal frequency, as shown in FIG. 5A, the voltage value is linearly increased during a video scanning period $T_1$, whereas the voltage value is decreased during the retrace blanking period $T_R$. Let it be assumed that, as shown in FIG. 5B, the horizontal frequency is doubled thereby reducing one horizontal scanning period $H_2$ to half of the above-described one horizontal scanning period $H_1$. Nevertheless, blanking period $T_R$ is necessarily constant regardless of the horizontal frequency, so that the video scanning period $T_2$ of the horizontal scanning period $H_2$ must become shorter than half of the video scanning period $T_1$ of the horizontal scanning period $H_1$. Therefore, the change in the horizontal frequency and the change of the video scanning period are not directly proportional to each other, so that in the horizontal deflection circuit of FIG. 1 an error occurs in the deflection width in accordance with the increase of the horizontal frequency, thereby a fluctuation in the deflection width occurs.

Further in the horizontal deflection circuit of FIG. 2 wherein the deflection width is detected and a detected difference is fed back to switching regulator 5 in a feedback loop, although an error can be prevented from being produced in the deflection width due to the horizontal frequency, an integrating circuit is needed to reduce the cut-off frequency in order to prevent the circuits forming the loop section from oscillating. Nevertheless, if the cut-off frequency is reduced as described above, then the response characteristic of switching regulator 5 deteriorates and switching regulator 5 cannot follow rapid changes in the horizontal frequency $f_H$. There is then the substantial risk that horizontal output circuit 6 will be damaged.

OBJECTS AND SUMMARY OF THE INVENTION

Accordingly, it is an object of the present invention to provide an improved horizontal deflection circuit that can eliminate the above-noted disadvantages encountered with previously proposed horizontal deflection circuits.

It is another object of the present invention to provide a horizontal deflection circuit that can perform satisfactory horizontal deflection following a change in the horizontal frequency of the video signal.

Still another object of the present invention is to provide a horizontal deflection circuit in which a deflection width can be detected satisfactorily without error.

A further object of the present invention is to provide a horizontal deflection circuit that is applicable to a multiple-scanning type television receiver.

According to one aspect of the present invention, a horizontal deflection circuit for a multiple-scanning type television receiver that can receive a video signal of different horizontal frequencies is comprised of a detecting circuit for detecting the deflection width of the input video signal, a comparator for comparing the detected signal from the deflection width detecting circuit with a picture size signal that is proportional to the picture size of the input video signal in the horizontal direction, an adder for adding the output of the comparator and the picture size signal, a voltage signal generating circuit for generating a voltage signal proportional to a horizontal frequency of the input video signal, and a multiplying circuit for multiplying the output signal of the adder and the output signal of the voltage signal generating circuit. Using this circuit the horizontal output circuit of the television receiver is controlled on the basis of the output signal of the multiplying circuit. According to the horizontal deflection circuit, a satisfactory horizontal deflection without any error can be provided following a rapid change in the horizontal frequency of the input video signal.

According to another aspect of the present invention, a horizontal deflection width detecting circuit is provided in which a horizontal deflection width of a video signal supplied to a multiple-scanning type television receiver capable of receiving a video signal of a plurality of horizontal frequencies is detected by peak-rectifying a horizontal deflection pulse. In this horizontal deflection width detecting circuit, a discharging current source proportional to the horizontal frequency of the input video signal is connected to a peak-rectifying circuit, so that a deflection width can be satisfactorily detected without error.

The preceding and other objects, features, and advantages of the present invention will become apparent from the following detailed description of preferred embodiments when read in conjunction with the accompanying drawings, in which like reference numerals represent the same or similar parts in the several views.

DETAILED DESCRIPTION OF THE PREFERRED EMBODIMENTS

Figure 6:
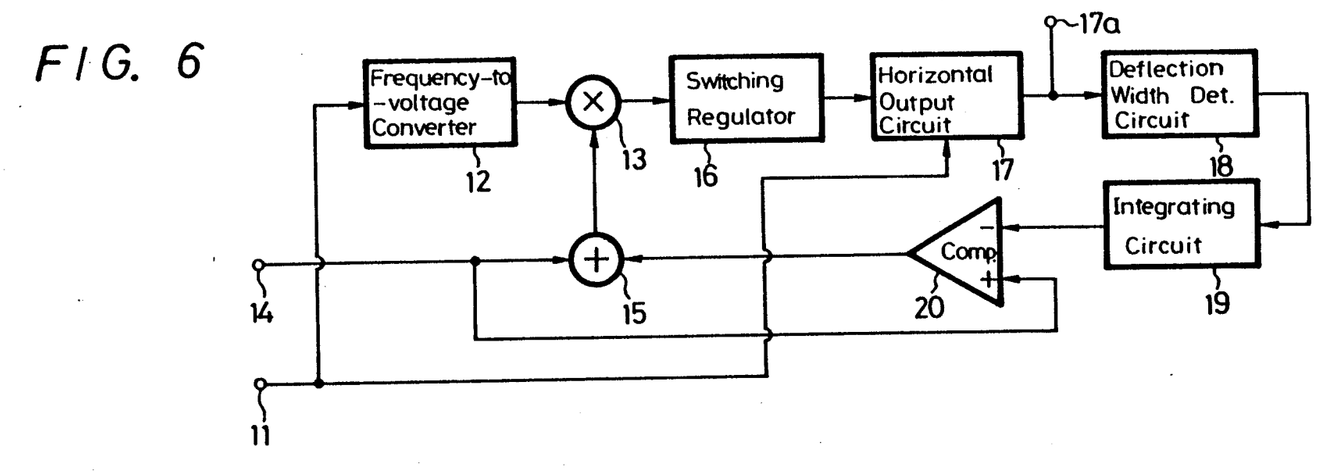
FIG. 6 is a schematic in block diagram form of an embodiment of a horizontal deflection circuit according to the present invention.

In FIG. 6, an embodiment of a horizontal deflection circuit according to the present invention is shown, in which the horizontal deflection circuit is applied to a so-called multiple-scanning type television receiver. A horizontal synchronizing signal of an input video signal of the kind that is supplied to the above-described multiple-scanning type television receiver (not shown) is fed to an input terminal 11 and supplied to a frequency-to-voltage converter 12, in which it is converted to a voltage signal whose voltage level changes in proportion to the frequency of the horizontal synchronizing signal. The voltage signal output from frequency-to-voltage converter 12 is supplied to one input of a multiplier 13.

Another input terminal 14 receives a deflection control signal having a voltage level proportional to a deflection width as determined by the size of the picture to be displayed on the television receiver screen. The deflection control signal applied to input terminal 14 is fed to one input of an adder 15. For example, the deflection control signal might be a voltage signal that is 1 Volt when the picture is a standard size and which becomes 0.5 Volt when the picture is half the standard size. Adder 15 also receives at another input a difference signal from a comparator 20, and adder 15 adds the deflection control signal and the difference signal.

The sum signal output from adder 15 is supplied to the other input of multiplier 13, so that in multiplier 13 the voltage signal corresponding to the frequency of the horizontal synchronizing signal is changed in response to the sum signal by the multiplication operation, and the product signal is 12 supplied as a control signal to a switching regulator 16. Switching regulator 16 generates a DC output signal in response to the multiplied signal that is supplied to a horizontal output circuit 17 as a power supply source signal. The horizontal synchronizing signal applied to input terminal 11 is also supplied to horizontal output circuit 17, whereby a horizontal deflection output signal based on the horizontal synchronizing signals is fed to an output terminal 17a that is connected to the horizontal deflection coil (not shown).

In this embodiment, the output signal from horizontal output circuit 17 is also supplied to a deflection width detecting circuit 18, wherein a horizontal deflection width of the output signal of the horizontal output circuit 17 is detected by deflection width detecting circuit 18. The detected signal is supplied to an integrating circuit 19, in which it is integrated and is fed as one input to comparator 20. The deflection control signal that is proportional to the deflection width and that is applied to deflection control signal input terminal 14 is the other signal input to comparator 20. Comparator 20 compares the deflection width indicated by the control signal with a real deflection width to generate a compared result, that is, a difference signal. The difference signal from comparator 20 is supplied to the other input of adder 15.

In the operation of the horizontal deflection circuit described above, the voltage signal from frequency-to-voltage converter 12 is a signal based on the frequency of the horizontal synchronizing signal applied to input terminal 11. Whereas, the signals added by adder 15 are the deflection control signal applied to input terminal 14 and the difference signal from comparator 20. Comparator 20 compares the deflection control signal, which is applied to input terminal 14 and whose level is determined by the size of the picture, and the detected signal indicative of the real deflection state in horizontal output circuit 17 and which is detected by deflection width detecting circuit 18. More specifically, the difference between the deflection width to be controlled and the real deflection width is represented by the difference signal output from comparator 20. When this difference signal and the deflection control signal, as determined by the size of the picture, are added to each other in adder 15, a deflection control signal corrected by the difference signal is generated. The thus corrected deflection control signal is then supplied to multiplier 13, wherein the voltage signal based on the frequency of the horizontal synchronizing signal is multiplied with the corrected deflection control signal. In this manner, the voltage signal is changed in response to the deflection width to be controlled. The thus multiplied voltage signal is supplied to switching regulator 16, so that a power supply source signal based on this voltage signal is supplied to horizontal output circuit 17.

The power supply source signal supplied to horizontal output circuit 17 is controlled as described above, whereby the power supply source signal proportional to the horizontal frequency of the incoming video signal is controlled by frequency-to-voltage converter 12 and the power supply source signal based on the difference between the real deflection width and the deflection width corresponding to the size of picture is controlled by comparator 20. In that case, although control proportional to the horizontal frequency of the input video signal by frequency-to-voltage converter 12 results in a maximum error of about 20% due to the horizontal frequency $f_H$, as shown in FIG. 4, frequency-to-voltage converter 12 has a high response characteristic relative to fluctuations in the horizontal frequency, so that the output source voltage signal of switching regulator 16 can be changed in a ganged relation to fluctuations of the horizontal frequency, thereby resulting in a very small error. This error is detected as the difference signal by comparator 20 and the deflection control signal is corrected on the basis of this difference signal, whereby the voltage signal after being multiplied by multiplier 13 is a voltage signal whose error is corrected. Therefore, switching regulator 16 can be controlled satisfactorily without error, and a good power supply source voltage signal without error, which can cope with fluctuations of the horizontal frequency, is supplied to horizontal output circuit 17, thus making it possible to perform satisfactory horizontal deflection following fluctuations of the horizontal frequency, so that the size of the picture is not changed at all.

The error at that time is about 20% of the fluctuation at maximum, as described above, so that comparator 20 can be prevented from detecting a large difference of the deflection width. Accordingly, even when the response characteristic is made low by integrating circuit 19, the amount to be corrected is small. Thus, when the horizontal frequency $f_H$ changes rapidly, horizontal output circuit 17 can be prevented from being overdriven and damaged.

While the size of picture, that is, the deflection width, is changed by changing the deflection control signal applied to input terminal 14 and whose level is changed in response to the size of picture in the above-described embodiment, the horizontal deflection circuit of the first embodiment is modified so that the size of the picture is fixed.

Figure 7:
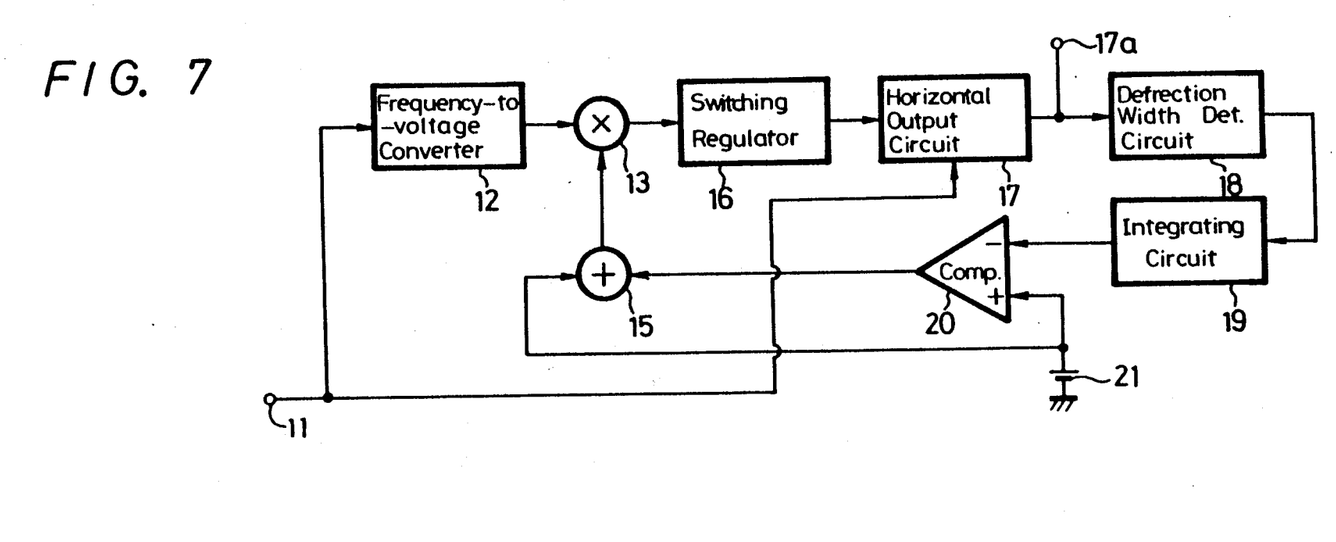
FIG. 7 is a schematic in block diagram form of another embodiment of a horizontal deflection circuit according to the present invention.

In another embodiment shown in FIG. 7, the deflection control signal is formed of a signal of constant potential from a reference voltage source 21 and supplied to one input terminal of adder 15 and to an input of comparator 20. The remainder of this embodiment is the same as the circuit arrangement of the embodiment described in relation to FIG. 6.

With this arrangement, comparator 20 compares the real deflection width and a constant deflection width, so that a deflection width being controlled always falls within a predetermined range.

Figure 8:
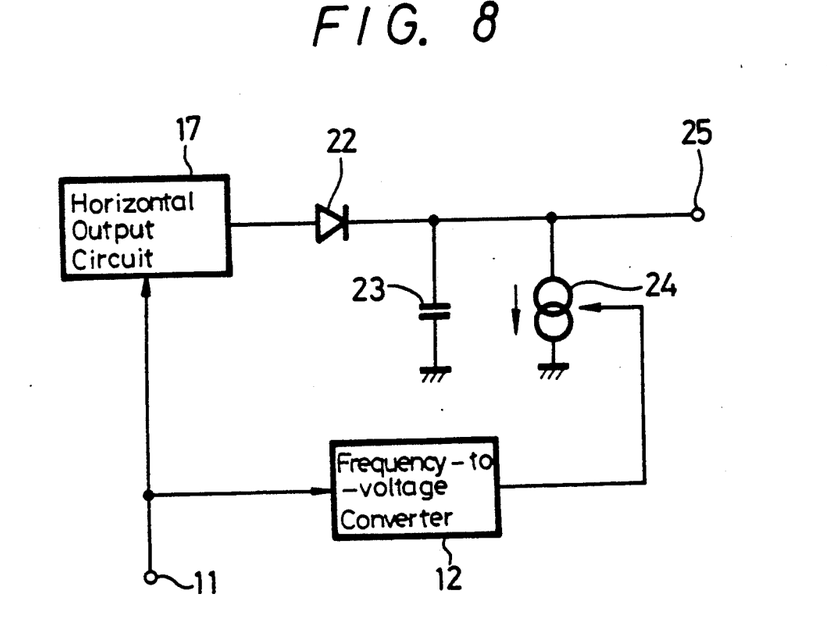
FIG. 8 is a schematic diagram useful in understanding the principle of the horizontal deflecting width detecting circuit used in the present invention.

An example of a horizontal deflection width detecting circuit used in the above-described embodiment of the present invention will be described with reference to FIGS. 8 to 10. More particularly, FIG. 8 shows a fundamental horizontal deflection width detecting circuit according to the principle of the present invention. In FIG. 8, like parts corresponding to those of FIGS. 6 and 7 are marked with the same reference numerals. The horizontal synchronizing signal applied to input terminal 11 is also supplied to horizontal output circuit 17, and horizontal output circuit 17 produces a horizontal deflection pulse signal whose phase is matched with that of the horizontal synchronizing signal. This horizontal deflection pulse signal is applied to one side of the horizontal deflection coil (not shown), that causes an electron beam to be deflected in the horizontal direction. Simultaneously, this horizontal deflection pulse signal is supplied to a horizontal deflection detecting circuit.

More specifically, the horizontal deflection pulse signal from horizontal output circuit 17 is supplied to the anode of a diode 22 whose cathode is connected to one electrode of a charging capacitor 23. The other electrode of capacitor 23 is connected to ground. The cathode of diode 22 is also connected to a current source 24, and the signal developed at the cathode of the diode 22 is fed to a deflection width detecting signal output terminal 25. The deflection width is based on the voltage value of the signal developed at output terminal 25. In this embodiment, the current value of current source 24 is controlled by frequency-to-voltage converter 12 as shown by the connection thereto. Frequency-to-voltage converter 12 receives the horizontal synchronizing signal fed in at horizontal synchronizing signal input terminal 11 and produces an output voltage on the basis of the frequency of that horizontal synchronizing signal. Thus, the current flow due to current source 24 is controlled by the output voltage signal from frequency-to-voltage converter 12, so in effect the current flow caused by current source 24 is controlled in response to the frequency of the horizontal synchronizing signal.

Figure 9:
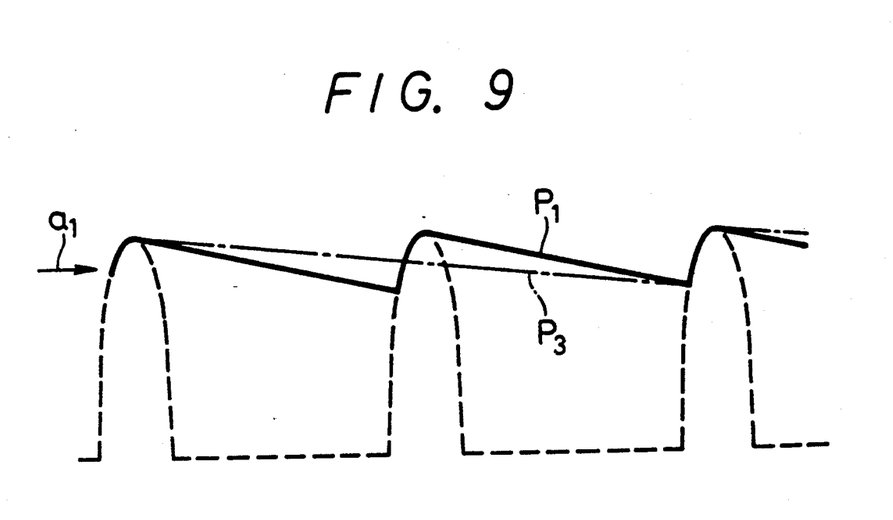
FIG. 9 is a waveform diagram useful in explaining the operation of the horizontal deflection width detecting circuit of the present invention.

The horizontal deflection pulse signal from horizontal output circuit 17 is a pulse signal corresponding to the interval of the horizontal synchronizing signals, as represented by the dashed line in FIG. 9. A peak value of this pulse signal is peak-rectified by diode 22 and capacitor 23. More specifically, this pulse signal charges capacitor 23, and the current flowing through current source 24 becomes the discharge current for capacitor 23. The voltage value of the peak-rectified signal developed at output terminal 25 is determined by the amount of the discharging current. The peak value $P_1$ of the horizontal deflection pulse signal determined as described above is represented by the solid line in FIG. 9.

Assuming, for example, that the horizontal frequency of the input video signal is reduced by half, then the interval between the horizontal deflection pulses is widened by a factor of two. If the discharging current is constant, the mean value is lowered as shown in FIG. 3. According to this embodiment, however, if the horizontal frequency changes, the discharging current of the current source 24 changes in proportion to the change of the horizontal frequency. Accordingly, as represented by the one-dot chain line of FIG. 9, a peak-rectified value $P_3$ at this horizontal frequency gradually changes with a more gentle slope. Therefore, when the amount by which the discharge current changes is determined so that the mean values of the peak-rectified values $P_1$ and $P_3$ are kept constant at level $a_1$, so long as the deflection width is constant, the mean voltage of the output signal at the output terminal can be prevented from changing due to changes in the horizontal frequency. Consequently, errors can be prevented from being produced in the deflection width detection based on the output voltage developed at output terminal 25.

Figure 10:
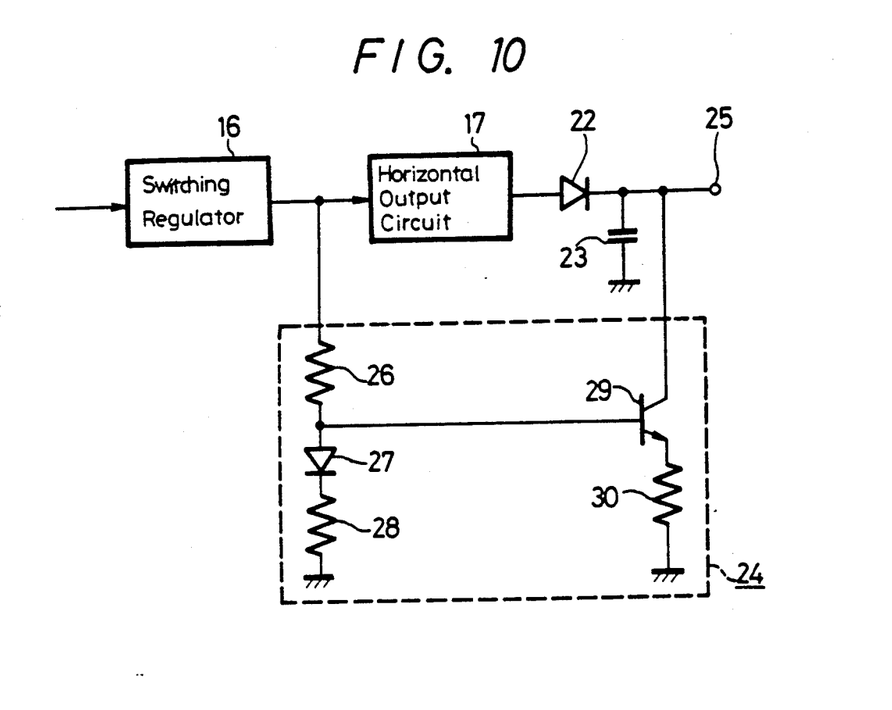
FIG. 10 is a schematic circuit diagram of another embodiment of a horizontal deflection circuit based on the principle of the horizontal deflection width detecting circuit of FIG. 8 according to the present invention.

FIG. 10 is a schematic circuit diagram of still another embodiment according to the present invention of a horizontal deflection circuit based on the principle of FIG. 8. In FIG. 10, like parts corresponding to those of FIGS. 6 through 8 are marked with the same reference numerals and need not be described in detail.

Referring to FIG. 10, the output signal from switching regulator 16, whose output signal is changed in response to the horizontal frequency, is supplied to horizontal output circuit 17 and also to a resistor 26 in current source or current control circuit 24. A horizontal deflection pulse signal from horizontal output circuit 17 is supplied through diode 22 to capacitor 23, whose the other electrode is connected to ground. Connected to the junction of diode 22 and capacitor 23 is output terminal 25, at which a deflection width detecting signal is developed. In current control circuit 24, the other end of resistor 26 is connected to ground via a series circuit made up of a diode 27 and a resistor 28. At the junction between resistor 26 and diode 27 the base electrode of an NPN transistor 29 is connected. The collector electrode of transistor 29 is connected to charging capacitor 23, and the emitter electrode thereof is connected to ground via a resistor 30 that serves as a discharging resistor.

With the above-described circuit arrangement, a voltage signal proportional to the horizontal frequency is developed at the junction between resistor 26 and diode 27 in current control circuit 24. This voltage signal is supplied to the base of transistor 29, whereby the amount of current flowing through discharging resistor 30 from the collector-emitter circuit of transistor 29 is controlled by the voltage signal. Therefore, the discharging amount of the charge in capacitor 23 is controlled in proportion to the horizontal frequency so that, as long as the horizontal deflection width is constant, as shown in FIG. 9, the mean voltage value of the deflection detecting signal developed at the output terminal 25 becomes constant, thereby preventing an error from occurring in the detecting signal.

Figure 11:
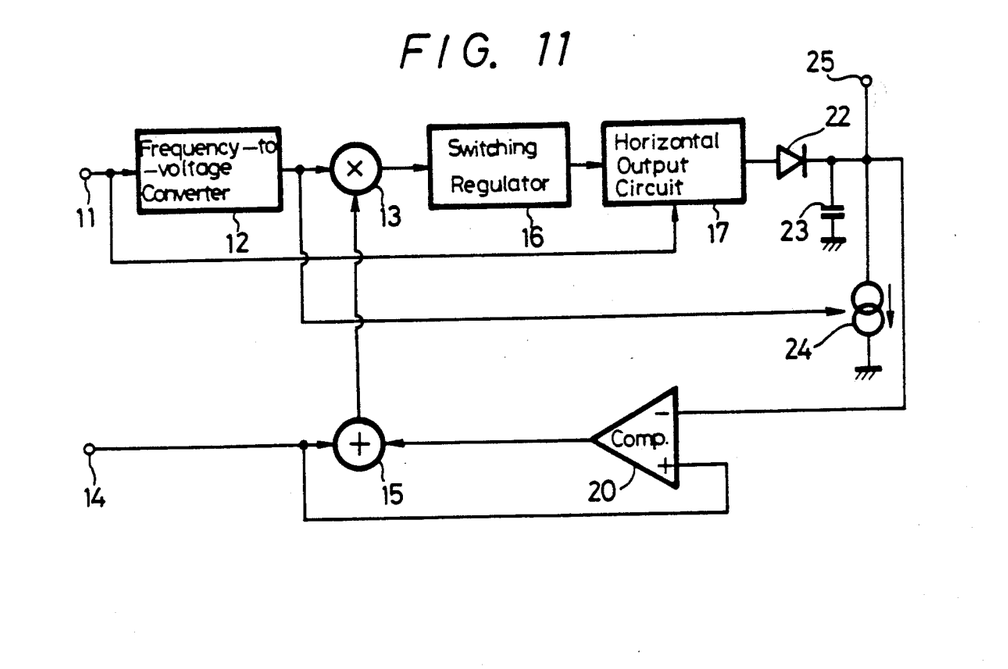
FIG. 11 is a schematic circuit diagram of another embodiment of a horizontal deflection circuit according to the present invention.

The control signal for the current source is not limited to the output signal of switching regulator 16, as shown in the embodiment of FIG. 10, and may be another signal whose voltage level is changed in proportion to the horizontal frequency. For example, as shown in FIG. 11, the amount of the discharging current may controlled by the output signal of the frequency-to-voltage converter that controls the switching regulator. This will be described more fully with reference to FIG. 11, in which like parts corresponding to those of the preceding embodiments are marked with the same reference numerals and need not be described in detail.

In FIG. 11, the horizontal synchronizing signal applied to input terminal 11 is supplied to frequency-to-voltage converter 12, in which it is converted to the voltage signal whose voltage level changes in proportion to the frequency of the horizontal synchronizing signal. The voltage signal from frequency-to-voltage converter 12 is supplied to one input terminal of multiplier 13. Input terminal 14 receives the deflection control signal having a voltage proportional to the deflection width, which is based on the size of the picture to be displayed. The deflection control signal applied to input terminal 14 is supplied to one input terminal of adder 15. In this case, the deflection control signal may be a voltage signal that is 1 Volt when the size of the picture is standard and which becomes 0.5 Volt when the size of picture is half the standard size.

Adder 15 also receives the difference signal output from comparator 20, which will be described below. In adder 15, the difference signal is added to the deflection control signal, and the summed signal from adder 15 is supplied to the other input terminal of multiplier 13. In multiplier 13, the voltage signal corresponding to the frequency of the horizontal synchronizing signal is changed in response to the summed signal by means of multiplication, and the product signal is supplied to switching regulator 16 as a control signal. Switching regulator 16 generates a DC output signal in response to the product signal from multiplier 13, and this DC output signal from switching regulator 16 is supplied to horizontal output circuit 17 as the power supply source signal. Then, the horizontal synchronizing signal applied to input terminal 11 is supplied to horizontal output circuit 17, from which there is derived the horizontal deflection pulse signal having a period based on this horizontal synchronizing signal.

In this embodiment, the output signal of horizontal output circuit 17 is supplied through diode 22 to charge capacitor 23 and to discharging current source 24. In that case, the value of current flowing through current source 24 is controlled by the output voltage of frequency-to-voltage converter 12. Then, the voltage signal developed at the junction between capacitor 23 and diode 22 is supplied to one input terminal of comparator 20. The deflection control signal applied to deflection control signal input terminal 14, which is proportional to the deflection width, is supplied to the other input of comparator 20. Comparator 20 compares the deflection width indicated by the control signal and the real deflection width indicated by the detected signal. Then, the difference signal derived from comparator 20 is supplied to the other input terminal of adder 15.

In operation of the above-described circuit arrangement the voltage signal from frequency-to-voltage converter 12 is a signal based on the frequency of the horizontal synchronizing signal applied to input signal The signals added by adder 15 are the deflection control signal applied to input terminal 14 and the difference signal from comparator 20. In this embodiment, comparator 20 compares the deflection control signal applied to input terminal 14, which is determined on the basis of the size of picture, and the charging potential of capacitor 23, which indicates the real deflection state from horizontal output circuit 17. In other words, the difference between the deflection width to be controlled and the real deflection width is represented by the difference signal from comparator 20. In adder 15, the difference signal is added to the deflection control signal, which is based on the size of the picture, thereby producing a deflection control signal that is corrected by the difference signal. The corrected deflection control signal is supplied to multiplier 13, wherein the voltage signal based on the frequency of the horizontal synchronizing signal is multiplied with the corrected deflection control signal, and the voltage level of the multiplied voltage signal is changed in response to the deflection width to be controlled. The multiplied voltage signal is supplied to switching regulator 16, and power supply source signal based on the voltage signal is supplied to horizontal output circuit 17.

As described above, the power supply source signal supplied to horizontal output circuit 17 is effectively control, by controlling the horizontal frequency of the input video signal by frequency-to-voltage converter 12 and by basing the power supply source signal on the difference between the real deflection width and the deflection width corresponding to the size of picture as determined by comparator 20. In that case, the value of current flowing through current source 24 is controlled by the voltage signal proportional to the horizontal frequency derived from frequency-to-voltage converter 12, whereby the deflection width is accurately detected. Thus, comparator 20 accurately detects the difference between the reference deflection width and the real deflection width, thus making it possible to accurately control the deflection width satisfactorily.

In the case of FIG. 11, since current source 24 is controlled by the output voltage of frequency-to-voltage converter 12 that is developed for controlling switching regulator 16, an exclusive current control signal generating circuit is not required, which can simplify the circuit arrangement.

According to the horizontal deflection circuit of the present invention, horizontal deflection is performed rapidly following fluctuation of the horizontal frequency, and the satisfactory horizon deflection can be carried out without change in picture size due to fluctuations of the horizontal frequency.

Further, according to the horizontal deflection width detecting circuit of the present invention, the deflection width, that is, the picture size, of the received video image can be satisfactorily detected without being adversely affected by fluctuations in the horizontal frequency. There is then the advantage that the present invention can be suitably applied to the so-called multiple-scanning type television receiver for receiving a video signal of a plurality of horizontal frequencies.

Having described preferred embodiments of the invention with reference to the accompanying drawings, it is to be understood that the invention is not limited to those precise embodiments and that various changes and modifications could be effected by one skilled in the

What is claimed is:

1. A horizontal deflection circuit for a multiple-scanning type television receiver that displays input video signals having different respective horizontal frequencies, comprising:

detecting means for detecting a deflection width of an input video signal and producing a detected output signal;

comparing means for comparing said detected output signal with a picture size signal proportional to a picture size of the input video signal in the horizontal direction and producing a compared output signal;

adding means for adding said compared output and said picture size signal;

voltage signal generating means for generating an output voltage signal proportional to the horizontal frequency of the input video signal; and multiplying means for multiplying an output signal of said adding means and said voltage signal and producing an output signal for controlling a horizontal output circuit of the television receiver.

2. A horizontal deflection circuit according to claim 1, wherein said picture size signal is produced as a constant potential by a DC voltage source and fed to said comparing means and to said adding means.

3. A horizontal deflection circuit according to claim 1, wherein said detecting means comprises a discharging current source producing a current proportional to the horizontal frequency of the input video signal and a peak-rectifying circuit connected to said discharging current source.

4. A horizontal deflection circuit according to claim 3, further comprising a switching regulator receiving the output signal from said multiplying means for producing a power supply voltage fed to the horizontal output circuit of the television receiver and to said discharging current source, so that the current of said discharging current source is controlled in response to the deflection width of the input video signal.

5. A horizontal deflection circuit according to claim 3, wherein said discharging current source is controlled in response to said output voltage signal from said voltage generating means.

* * * * *